Patented Aug. 7, 1945

2,381,434

UNITED STATES PATENT OFFICE 2,381,434

PROCESS OF ISOMERIZATION

Robert E. Burk, Cleveland Heights, and Herman P. Lankelma, Shaker Heights, Ohio, assignors to The Standard Oil Company, Cleveland, Ohio, a corporation of Ohio No Drawing. Application April 26, 1940, Serial No. 331,894

4 Claims. (Cl. 260—683.5)

It has been known for a long time that heating normally liquid high boiling hydrocarbons to boiling point with aluminum chloride occasions breaking down of the molecule or cracking into lower boiling products, and such procedure has been practiced commercially. It has also been well-known to polymerize high boiling liquid hydrocarbons by warming them with such agent to temperatures slightly below the boiling point of water. And catalysts of this type have been regarded as essentially concerned with change in size of molecules. We have now found however that a peculiar effect may be had with refrigeration or low temperatures, and operation of a hydrogen halide with an aluminum halide, the elements in a hydrocarbon chain for instance being rearranged or isomerized, such as to the formation of branched chain compounds, without cracking or particular change in molecular weight.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

The material to be treated, for instance a hydrocarbon of straight chain character or a hydrocarbon mixture in which straight chains are prominent, is chilled to a relatively low temperature, in practice, e. g. conveniently on the order of 0° C. down to minus 30° C., and the temperature should be at least as low as 10° C. Hydrogen halide, such as hydrogen bromide or hydrogen chloride is passed into the hydrocarbon which is provided with a charge of aluminum halide or an aluminum halide complex. The amount of charge may be 0.5 to 15 per cent, depending upon the extent of action desired. The hydrogen halide is passed in gaseous form into the liquid hydrocarbon. Where desired, the hydrogen halide may be fed in under pressure. By control of the temperature and control of the amount of hydrogen halide fed, the extent of action on the hydrocarbons may be controlled quite precisely. And, with proper conditions there is no evolution of gas. After subjection to the treatment for the desired length of time, depending upon the hydrocarbon and the extent of action desired, the aluminum halide may be separated from the hydrocarbon mixture and the latter may be fractionated if a close separation of the isomerized product is desired. Seventy per cent and more of isomers may thus be obtained, and the remaining hydrocarbons are of course very useful products. Slightly branched hydrocarbons may be thus treated to form products having more branching structure. Naphthas likewise may be particularly conveniently treated. A high yield of isomers thus is contrary to the teaching of the art, as pointed out for instance by Calingaert and others.

As an example: A hydrocarbon essentially consisting of n-hexane is treated by admixture of about 10 per cent of anhydrous aluminum bromide, dissolved therein, and the temperature reduced by chilling to 0° C., and a slow stream of hydrogen bromide is passed in to saturation. After standing several days at this temperature, aluminum bromide is removed from the hydrocarbon, and the latter is fractionally distilled, with a high yield of isohexanes, a considerable portion of which is aviation neohexane.

Similarly, other hydrocarbons may be treated.

Hydrocarbon mixtures which contain such large amounts of unsaturated and aromatic hydrocarbons as to be undesirable for direct treatment by this process can be first separated from excessive amounts of the unsaturated aromatic hydrocarbons such as by extracting with selective solvents, or reaction with halides and the paraffin hydrocarbon fraction may then be isomerized.

Other modes of applying the principle of the invention may be employed, change being made as regards the details described, provided the features stated in any of the following claims, or the equivalent of such, be employed.

We therefore particularly point out and distinctly claim as our invention:

1. A process of isomerization, which comprises contacting a naphtha containing substantial amounts of hexanes with a catalyst consisting of not over 15 mol per cent of an aluminum halide based on the naphtha and hydrogen halide in a large amount to saturation at a temperature of from not above 0° C. down to —30° C., and continuing the contact at said temperature for a period of time to provide high yields of hexane isomers of more branched structure and with a minimum of cracking of the hexanes.

2. A process of isomerization, which comprises contacting a hydrocarbon fraction containing primarily hexanes with a catalyst consisting of not over 15 mol per cent of an aluminum halide based on the hydrocarbons and hydrogen halide in a large amount to saturation at a temperature of from not above 0° C. down to —30° C., and continuing the contact at said temperature for a period of time to provide high yields of hexane isomers of more branched structure and with a minimum of cracking of the hexanes.

3. A process of isomerization, which comprises contacting n-hexane with a catalyst consisting of not over 15 mol per cent of an aluminum halide based on the n-hexane and hydrogen halide in a large amount to saturation at a temperature of from not above 0° C. down to —30° C., and continuing the contact at said temperature for a period of time to provide high yields of isomeric hexanes with a minimum of cracking of the hexanes.

4. A process of isomerizing hydrocarbons, which comprises contacting a hydrocarbon fraction containing primarily normal hexane with a catalyst consisting of not over 15 mol per cent of aluminum bromide based on the hydrocarbons and hydrogen bromide in a large amount to saturation at a temperature of from not above 0° C. down to —30° C., and continuing the contact at said temperature for a period of time to provide high yields of hexane isomers with a minimum of cracking of the hexanes.

ROBERT E. BURK.
HERMAN P. LANKELMA.